US012735612B2

(12) United States Patent
Bai et al.

(10) Patent No.: US 12,735,612 B2
(45) Date of Patent: Sep. 15, 2026

(54) SOLVENTLESS ADHESIVE COMPOSITIONS AND LAMINATE MATERIALS PREPARED WITH THE SAME

(71) Applicant: ARKEMA FRANCE, Puteaux (FR)

(72) Inventors: Chenyan Bai, Shanghai (CN); Thorsten Schmidt, Richterswil (CH)

(73) Assignee: ARKEMA FRANCE, Puteaux (FR)

(*) Notice: Subject to any disclaimer, the term of this patent is extended or adjusted under 35 U.S.C. 154(b) by 191 days.

(21) Appl. No.: 18/577,350

(22) PCT Filed: Jul. 30, 2021

(86) PCT No.: PCT/CN2021/109567

§ 371 (c)(1),
(2) Date: Jan. 8, 2024

(87) PCT Pub. No.: WO2023/004741

PCT Pub. Date: Feb. 2, 2023

(65) Prior Publication Data

US 2024/0191112 A1 Jun. 13, 2024

(51) Int. Cl.

| | |
|---|---|
| ***C09J 175/04*** | (2006.01) |
| ***B32B 7/12*** | (2006.01) |
| ***B32B 15/085*** | (2006.01) |
| ***B32B 15/09*** | (2006.01) |
| ***B32B 15/20*** | (2006.01) |
| ***B32B 27/32*** | (2006.01) |
| ***B32B 27/36*** | (2006.01) |
| ***B32B 37/12*** | (2006.01) |
| ***C08G 18/10*** | (2006.01) |
| ***C08G 18/34*** | (2006.01) |
| ***C08G 18/38*** | (2006.01) |
| ***C08G 18/40*** | (2006.01) |
| ***C08G 18/42*** | (2006.01) |
| ***C08G 18/44*** | (2006.01) |
| ***C08G 18/48*** | (2006.01) |
| ***C08G 18/66*** | (2006.01) |
| ***C08G 18/75*** | (2006.01) |
| ***C09J 5/00*** | (2006.01) |

(52) U.S. Cl.

CPC ............... *C09J 175/04* (2013.01); *B32B 7/12* (2013.01); *B32B 15/085* (2013.01); *B32B 15/09* (2013.01); *B32B 15/20* (2013.01); *B32B 27/325* (2013.01); *B32B 27/36* (2013.01); *B32B 37/12* (2013.01); *C08G 18/10* (2013.01); *C08G 18/348* (2013.01); *C08G 18/3885* (2013.01); *C08G 18/4018* (2013.01); *C08G 18/42* (2013.01); *C08G 18/44* (2013.01); *C08G 18/4829* (2013.01); *C08G 18/6633* (2013.01); *C08G 18/6666* (2013.01); *C08G 18/755* (2013.01); *C08G 18/758* (2013.01); *C09J 5/00* (2013.01); *B32B 2255/26* (2013.01); *B32B 2307/31* (2013.01); *B32B 2307/748* (2013.01); *C09J 2475/00* (2013.01)

(58) Field of Classification Search

CPC .... C09J 175/04; C09J 2475/00; C09J 175/06; C09J 175/08; C08G 18/3885; C08G 18/10; C08G 18/44; C08G 18/6633; C08G 18/6666; C08G 18/4202; C08G 18/6625; B32B 37/12; B32B 2255/06

See application file for complete search history.

(56) References Cited

U.S. PATENT DOCUMENTS

| | | | | |
|---|---|---|---|---|
| 10,960,642 | B2 | 3/2021 | Ohara et al. | |
| 11,608,457 | B2 | 3/2023 | Bai et al. | |
| 2004/0014847 | A1* | 1/2004 | Bolte | C08G 18/4216 528/44 |
| 2022/0177752 | A1* | 6/2022 | Li | C08G 18/4238 |
| 2023/0142982 | A1* | 5/2023 | Xie | C09J 175/06 156/310 |

FOREIGN PATENT DOCUMENTS

| | | | |
|---|---|---|---|
| CN | 107118734 | A | 9/2017 |
| CN | 108473842 | A | 8/2018 |
| CN | 108587549 | A | 9/2018 |
| CN | 109890929 | A | 6/2019 |
| JP | 2003321664 | A | 11/2003 |
| JP | 2010059362 | A | 3/2010 |
| WO | 2020180921 | A1 | 9/2020 |
| WO | 2020199175 | A1 | 10/2020 |

* cited by examiner

*Primary Examiner* — Alicia J Weydemeyer
*Assistant Examiner* — Wendy L Boss
(74) *Attorney, Agent, or Firm* — Gemini Law LLP

(57) ABSTRACT

Disclosed is a solventless adhesive composition comprising (A) an isocyanate component obtained by the reaction of reactants comprising at least one monomeric cycloaliphatic isocyanate compound comprising at least one cyclohexyl (ene) group and at least one first polyol; and (B) a polyol component comprising particularly selected functionalized and non-functionalized polyol. The solventless adhesive composition can be used for the production of laminate materials, e.g. laminate packing material, which well meet the requirements of various food compliance regulations and has superior performance properties such as heat and chemical resistance. A method for producing said laminate material and the resultant laminate material are also disclosed.

9 Claims, No Drawings

SOLVENTLESS ADHESIVE COMPOSITIONS AND LAMINATE MATERIALS PREPARED WITH THE SAME

FIELD OF THE INVENTION

The present disclosure relates to a unique solventless (SL) adhesive composition, a laminate material produced by using the same, and a method for producing the laminate material. The laminate material comprising an adhesive layer derived from the solventless adhesive composition well meets the requirements of various food compliance regulations and exhibits superior performance properties such as good heat and chemical resistance evidenced by good bond strength after heat treatment.

BACKGROUND

Adhesive compositions are useful for a wide variety of applications. For instance, they can be used to bond substrates such as polyethylenes, polypropylenes, polyesters, polyamides, metals, papers, or cellophanes to form composite films, i.e. laminates. The use of adhesives in different laminating end-use applications is generally known. For example, adhesives can be used in the manufacture of film/film and film/foil laminates commercially used in the packaging industry. The laminates comprising metal foil are widely used due to their desirable properties such as good light shielding properties, gas/moisture barrier property, and the like. Nevertheless, the foil-containing laminates prepared by using SL adhesive face two challengers: the first one is the difficulty in achieving good appearance when the production line is operated at high speed, and the second one the difficulty in maintaining good mechanical properties, such as bond strength, after heat treatment, like hot filing or retortion. Therefore, there is a long-standing need to develop a unique adhesive which can be used for the production of a laminate packing material exhibiting desirable optical performance, heat resistance and good mechanical strength under high throughput rate.

After persistent exploration, we have surprisingly developed a unique SL adhesive composition which can achieve the above stated targets.

SUMMARY OF THE INVENTION

The present disclosure provides a unique SL adhesive composition, a laminate material, e.g. a laminate packing material, prepared by using the SL adhesive composition, and a method for preparing the laminate material.

In a first aspect of the present disclosure, the present disclosure provides a solventless adhesive composition, comprising:

(A) an isocyanate component comprising a prepolymer which is the reaction product of reactants comprising: (a) at least one monomeric cycloaliphatic isocyanate compound comprising at least one cyclohexyl(ene) group and at least two isocyanate groups, and (b) at least one first polyol selected from the group consisting of a first polyester polyol, optionally a first polyether polyol, optionally a first polycarbonate polyol, and combinations thereof, wherein the prepolymer comprises more than one free isocyanate groups; and (B) a polyol component comprising at least one second polyol selected from the group consisting of a carboxylic acid functionalized-polyol having hydroxyl group and acid side group, a phosphorous-functionalized polyol comprising at least one phosphate ester group, a second polyester polyol, a second polyether polyol, and any combinations thereof.

In a second aspect of the present disclosure, the present disclosure provides a laminate material, e.g. a laminate packaging material (especially a packaging material for packaging food), comprising at least one first substrate, at least one second substrate, and at least one adhesive layer sandwiched therebetween, wherein the adhesive layer is derived from the solventless adhesive composition according to the present disclosure, and each of the first and second substrate is independently selected from the group consisting of metal foil, polymer layer, fabric layer, and combinations thereof.

In a third aspect of the present disclosure, the present disclosure provides a method of producing the laminate material of the present disclosure, comprising:

(a) providing at least one first substrate and at least one second substrate; and (b) adhering the first substrate and the second substrate together by using the solventless adhesive composition of the present disclosure.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

According to an embodiment of the present disclosure, the adhesive composition is a "two-part" or "two-package" composition comprising an isocyanate component (A) and a polyol component (B). According to another embodiment, the isocyanate component (A) and the polyol component (B) are packaged, transported and stored separately, combined shortly or immediately before being used for the manufacture of the laminate article.

Without being limited to any specific theory, the technical breakthrough of the present disclosure mainly resides in the particularly designed formulation of the adhesive composition. Especially, it is found that the polyurethane system prepared by using (A) a prepolymer derived from cyclohexyl(ene) group (e.g. cyclohexyl group or cyclohexylene group)-containing monomeric isocyanate compound, polyester polyol, and optional polyether/polycarbonate polyol, (B) a polyol component composed of carboxylic acid functionalized-polyol, phosphorous-functionalized polyol, polyester polyol and polyether polyol can be used as adhesive for a laminate material, such as a foil-adhesive-polymer laminate packaging material, exhibiting desirable performance properties. It is also found that the categories and relative contents of the ingredients used for each of the above stated components can be further modified to achieve further improvements in the performance properties of the SL adhesive and the laminate material.

The Isocyanate Component (A)

According to an embodiment of the present disclosure, the isocyanate component (A) has an average NCO functionality of at least about 1.5, or from about 1.6 to 10, or from about 1.7 to about 8, or from about 1.8 to about 6, or from about 1.9 to about 5, or from about 2 to about 4, or from about 2 to about 3, or from about 2 to 2.5, or within a numerical range obtained by combining any two of the above indicated end points. For example, the isocyanate component (A) has an average NCO functionality of 2.0.

According to an embodiment, the prepolymer contained in the isocyanate component (A) is a reaction product formed by the reaction of (a) at least one monomeric cycloaliphatic isocyanate compound comprising at least one cyclohexyl(ene) group and at least two isocyanate groups, and (b) at least one first polyol selected from the group consisting of a first polyester polyol, optionally a first polyether polyol, optionally a first polycarbonate polyol, and combinations thereof, wherein the prepolymer comprises more than one free isocyanate groups, such as at least two free isocyanate groups. For example, the prepolymer has an average NCO functionality of larger than 1.0, or at least 1.5, or at least about 2.0, or from about 2.0 to 10, or from about 2.0 to about 8, or from about 2.0 to about 6, or from about 2.0 to about 5, or from about 2 to about 4, or from about 2 to about 3, or from about 2 to 2.5, or has a NCO functionality of 2.0, or within a numerical range obtained by combining any two of the above indicated end points.

According to an embodiment of the present disclosure, the monomeric cycloaliphatic isocyanate compound used for preparing the prepolymer includes various isomers of isophorone diisocyanate (IPDI), methylene-bis(cyclohexylisocyanate) (HMDI) and the mixture of IPDI and HMDI. According to an embodiment of the present disclosure, the isophorone diisocyanate comprises isophorone-1,4-diisocyanate, isophorone-1,2-diisocyanate and isophorone-1,3-diisocyanate. According to an embodiment of the present disclosure, the methylene-bis(cyclohexylisocyanate) comprises methylene-bis(4-cyclohexylisocyanate), methylene-bis(3-cyclohexylisocyanate) and methylene-bis(2-cyclohexylisocyanate). According to a preferable embodiment of the present disclosure, the isophorone diisocyanate has a molecular structure represented by Formula IIIa, and the methylene-bis(cyclohexylisocyanate) has a molecular structure represented by Formula IIIb.

Formula IIIa

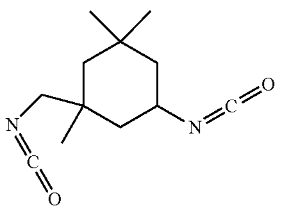

-continued

Formula IIIb

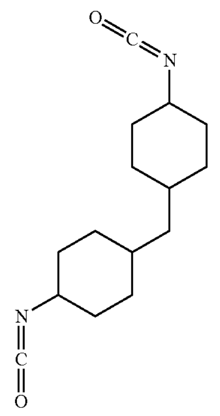 [SMILES: O=C=NC1CCC(CC2CCC(N=C=O)CC2)CC1]

In an embodiment of the present disclosure, the content of the (a) monomeric cycloaliphatic isocyanate compound is from 30 to 70 wt %, based on the total weight of the isocyanate component (A), such as within a numerical range obtained by combining any two of the following end points: 30 wt %, 32 wt %, 35 wt %, 38 wt %, 40 wt %, 42 wt %, 45 wt %, 48 wt %, 50 wt %, 52 wt %, 55 wt %, 58 wt %, 60 wt %, 62 wt %, 65 wt %, 68 wt % and 70 wt %, based on the total weight of the isocyanate component (A).

According to an embodiment of the present disclosure, the component (A) exclusively comprises IPDI and/or HMDI as isocyanate raw materials for preparing the prepolymer and does not comprise any isocyanate-functionalized compounds other that IPDI and HMDI. According to another embodiment of the present disclosure, the solventless adhesive composition does not comprise any isocyanate-functionalized compounds or precursor thereof other that IPDI and HMDI.

The present disclosure also includes embodiments in which isocyanate compounds other than the above stated monomeric cycloaliphatic isocyanate compound, especially other than the IPDI and HMDI, may be used, and such isocyanate compounds will be known as "secondary isocyanate compounds", "supplemental isocyanate compounds" or "additional isocyanate compounds" in the context of the present disclosure. In the embodiments comprising said secondary isocyanate compounds, the secondary isocyanate compounds may be part of the raw materials for preparing the prepolymer, i.e. can be used in combination with the IPDI and/or HMDI for preparing the prepolymer of component (A). Alternatively, the secondary isocyanate compounds can be an ingredient independent of the prepolymer. An embodiment comprising the combination of the above two situations is also a concept of the present disclosure.

According to the embodiments comprising said secondary isocyanate compounds, the secondary isocyanate compounds may include one or more isocyanate compounds comprising at least two isocyanate groups, preferably comprising two isocyanate groups. According to an embodiment, the secondary isocyanate compound is selected from the group consisting of $C_2$-$C_{12}$ aliphatic isocyanates comprising at least two isocyanate groups, $C_6$-$C_{15}$ cycloaliphatic comprising at least two isocyanate groups (other than the above stated monomeric cycloaliphatic isocyanate compound, especially other than IPDI and HMDI), and combinations thereof. Exemplary secondary isocyanate compounds can be selected from the group consisting of hexamethylene-1,6-diisocyanate, tetramethylene-1,4-diisocyanate, isomers of hexamethylene dipolyisocyanate ("HDI"), or mixtures thereof. According to an embodiment of the present disclosure, the isocyanate component (A) does not comprise aromatic isocyanate or araliphatic isocyanate for the secondary isocyanate compound. According to another embodiment of the present disclosure, the content of the secondary isocyanate compound can be from 1 wt % to 50 wt %, or from 2 wt % to 45 wt %, or from 5 wt % to 40 wt %, or from 8 wt % to 35 wt %, or from 10 wt % to 30 wt %, or from 12 wt % to 25 wt %, or from 15 wt % to 20 wt %, or ≤15 wt %, or ≤12 wt %, or ≤10 wt %, or ≤8 wt %, or ≤6 wt %, or ≤5 wt %, or ≤2 wt %, or ≤1 wt %, or 0 wt %, based on the total weight of all the isocyanate compounds (i.e. the combined weight of the monomeric cycloaliphatic isocyanate compound and the secondary isocyanate compound). Compounds having isocyanate groups, such as the above said prepolymer, IPDI/HMDI and the secondary isocyanate compounds, may be characterized by the parameter "% NCO" which is the amount of isocyanate groups by weight based on the weight of the compound. The parameter % NCO can be measured by the method of ASTM D 2572-97 (2010). According to an embodiment of the present disclosure, the prepolymer and the secondary isocyanate compound may have a % NCO of at least 3 wt %, or at least 5 wt %, or at least 7 wt %. In some embodiments, the prepolymer and the secondary isocyanate compound have a % NCO not to exceed 40 wt %, 35 wt %, 30 wt %, or 25 wt %, or 22 wt %, or 20 wt %.

According to an embodiment of the present disclosure, the raw materials for preparing the prepolymer of component (A) do not comprise hexamethylene diisocyanate (HDI) or any isomers/dimer/trimer/oligomer thereof. According to another embodiment of the present disclosure, the raw materials for preparing the prepolymer of component (A) do not comprise xylylene diisocyanate (XDI) or any isomers/dimer/trimer/oligomer thereof.

According to an embodiment of the present disclosure, the first polyol used for preparing the prepolymer of component (A) can be selected from the group consisting of a first polyester polyol, optionally a first polyether polyol, optionally a first polycarbonate polyol, and combinations thereof.

According to an embodiment of the present disclosure, the first polyester polyol has a hydroxyl functionality of at least 1.8, at least 2.0, and up to 2.2, or up to 2.5, or up to 2.8, or up to 3.0, or within a numerical range obtained by combining any two of the above indicated end points. The first polyester polyol may have a molecular weight from 500 to 5,000 g/mol, or from 600 to 3,000 g/mol, or from 800 to 2,000 g/mol, or from 1,000 to 1,500 g/mol, or within a numerical range obtained by combining any two of the above indicated end points. The polyester polyol is typically obtained by reacting polyfunctional alcohols having from 2 to 12 carbon atoms, preferably from 2 to 10 carbon atoms, with polyfunctional carboxylic acids having from 2 to 12 carbon atoms, preferably 2 to 10 carbon atoms, or anhydrides/esters thereof. Typical polyfunctional alcohols for preparing the polyester polyol are preferably diols, triols, tetraols, and may include ethylene glycol, butylene glycol, diethylene glycol, triethylene glycol, polyalkylene glycols, 1,2-propanediol, 1,3-propanediol, 1,3-butanediol, 1,4-butanediol, 1,6-hexanediol, neopentyl glycol, trimethylolpropane, glycerol, erythritol, pentaerythritol, trimethylolbenzene, and any combinations thereof. Typical polyfunctional carboxylic acids for preparing the first polyester polyol can be aliphatic, cycloaliphatic, araliphatic, aromatic or heterocyclic and may be substituted, for example with halogen atoms, and/or may be saturated or unsaturated. Preferably, the polyfunctional carboxylic acids are selected from the group consisting of adipic acid, suberic acid, azelaic acid, sebacic acid, phthalic acid, isophthalic acid, glutaric acid, tetrachlorophthalic acid, maleic acid, fumaric acid, itaconic acid, malonic acid, 2-methyl succinic acid, 3,3-diethyl glutaric acid, 2,2-dimethyl succinic acid, trimellitic acid, the anhydrides thereof, and any combinations thereof. Preference is given to adipic acid or a mixture of adipic acid and isophthalic acid. In another embodiment, the first polyester polyol has an OH number of 30 to 200 mg KOH/g, preferably from 40 to 180 mg KOH/g, and more preferably from 50 to 160 mg KOH/g. According to an embodiment of the present disclosure, the content of the first polyester polyol is from 50 wt % to 100 wt %, based on the total weight of the first polyol (b), such as within a numerical range obtained by combining any two of the following end points: 50 wt %, 52 wt %, 55 wt %, 58 wt %, 60 wt %, 62 wt %, 65 wt %, 68 wt %, 70 wt %, 72 wt %, 75 wt %, 78 wt %, 80 wt %, 82 wt %, 85 wt %, 88 wt %, 90 wt %, 92 wt %, 95 wt %, 98 wt % and 100 wt %, based on the total weight of the first polyol (b).

According to an embodiment of the present disclosure, the first polyether polyol has a hydroxyl functionality of 1.8 to 3.0, such as at least 1.8, or at least 2.0, or at least 2.2, or at least 2.5, or up to 2.6, or up to 2.7, or up to 2.8, or up to 2.9, or up to 3.0, or within a numerical range obtained by combining any two of the above indicated end points. The first polyether polyol may have a molecular weight from 400 to 5,000 g/mol, or from 500 to 4,000 g/mol, or from 600 to 3,000 g/mol, or from 800 to 2,000 g/mol, or from 1,000 to 1,500 g/mol, or within a numerical range obtained by combining any two of the above indicated end points. For example, the first polyether polyols can be prepared by polymerization of one or more alkylene oxides selected from ethylene oxide (EO), propylene oxide (PO), butylene oxide, tetrahydrofuran, trimethylolpropane, glycerol, erythritol, pentaerythritol, trimethylolbenzene, trishydroxyethyl isocyanurate, the condensation products of polyhydric alcohols, and any combinations thereof. Suitable examples of the first polyether polyols include polypropylene glycol (PPG), polyethylene glycol (PEG), polybutylene glycol, polytetramethylene ether glycol (PTMEG), and any combinations thereof. Alternatively, the polyether polyols can be the combinations or copolymers of PEG and at least one another polyether polyol as described above. For example, the polyether polyols can be the combinations of PEG and at least one of PPG, polybutylene glycol, and PTMEG. According to an embodiment of the present disclosure, the amount of the above stated first polyether polyols can be 0-50 wt %, or at most 40 wt %, or at most 30 wt %, or at most 20 wt %, or at most 10 wt % of the total weight of the first polyols.

According to an embodiment of the present disclosure, the first polycarbonate polyol has a hydroxyl functionality of at least 1.8, at least 2.0, or at least 2.1, or at least 2.2, or at least 2.3, or at least 2.4, or at least 2.5, or up to 2.6, or up to 2.7, or up to 2.8, or up to 2.9, or up to 3.0, or within a numerical range obtained by combining any two of the above indicated end points. The first polycarbonate polyol may have a molecular weight from 500 to 5,000 g/mol, or from 600 to 3,000 g/mol, or from 800 to 2,000 g/mol, or from 1,000 to 1,500 g/mol, or within a numerical range obtained by combining any two of the above indicated end points. For example, polycarbonate polyols may include those derived from butanediol, hexanediol, and cyclohexanedimethanol. In the above stated embodiments, the amount of the first polycarbonate polyol can be from 10 wt % to 50 wt %, such as 15 wt % to 45 wt %, or 20 wt % to 40 wt %, or 25 wt % to 35 wt %, or at most 40 wt %, or at most 30 wt %, or at most 20 wt %, or at most 10 wt %, or at most 5 wt %, or at most 2 wt %, or at most 1 wt %, or 0 wt % of the total weight of the first polyols, or within a numerical range obtained by combining any two of the above indicated end points.

In an embodiment of the present disclosure, and the content of the (b) first polyol is 30-70 wt %, based on the total weight of the isocyanate component (A), such as within a numerical range obtained by combining any two of the following end points: 30 wt %, 32 wt %, 35 wt %, 38 wt %, 40 wt %, 42 wt %, 45 wt %, 48 wt %, 50 wt %, 52 wt %0, 55 wt %, 58 wt %, 60 wt %, 62 wt %, 65 wt %, 68 wt % and 70 wt %, based on the total weight of the isocyanate component (A).

The Polyol Component (B)

According to various embodiments of the present disclosure, the polyol component comprises at least one second polyol selected from the group consisting of a carboxylic acid functionalized-polyol having hydroxyl group and acid side group, a phosphorous-functionalized polyol comprising at least one phosphate ester group, a second polyester polyol, a second polyether polyol, and any combinations thereof.

According to one embodiment of the present disclosure, the second polyol comprises a combination of the phosphorous-functionalized polyol, the second polyester polyol and the second polyether polyol. According to another embodiment of the present disclosure, the second polyol comprises a combination of the carboxylic acid functionalized-polyol, the phosphorous-functionalized polyol, the second polyester polyol and the second polyether polyol.

According to an embodiment of the present disclosure, the second polyester polyol has a hydroxyl functionality of at least 1.8, or at least 1.9, or at least 2.0, or at least 2.1, or at least 2.2, or up to 2.3, or up to 2.4, or up to 2.5, or up to 2.6, or up to 2.7, or up to 2.8, or up to 2.9, or up to 3.0, or within a numerical range obtained by combining any two of the above indicated end points. The second polyester polyol may have a molecular weight from 500 to 5,000 g/mol, or from 600 to 3,000 g/mol, or from 800 to 2,000 g/mol, or from 1,000 to 1,500 g/mol, or within a numerical range obtained by combining any two of the above indicated end points. The above introduction about the origin, preparation process, category, molecular structure and various parameters of first polyester polyol also apply to this second polyester polyol. According to an embodiment of the present disclosure, the content of the second polyester polyol is from 20 wt % to 60 wt %, based on the total weight of the polyol component (B), such as within a numerical range obtained by combining any two of the following end points: 20 wt %, 22 wt %, 25 wt %, 28 wt %, 30 wt %, 32 wt %, 35 wt %, 38 wt %, 40 wt %, 42 wt %, 45 wt %, 48 wt %, 50 wt %, 52 wt %, 55 wt %, 58 wt % and 60 wt %, based on the total weight of the polyol component (B).

According to an embodiment of the present disclosure, the second polyether polyol has a hydroxyl functionality of 1.8 to 3.0, such as at least 1.8, or at least 1.9, or at least 2.0, or at least 2.1, or at least 2.2, or at least 2.3, or up to 2.4, or up to 2.5, or up to 2.6, or up to 2.7, or up to 2.8, or up to 2.9, or up to 3.0, or within a numerical range obtained by combining any two of the above indicated end points. The second polyether polyol may have a molecular weight from 400 to 5,000 g/mol, or from 500 to 4,000 g/mol, or from 600 to 3,000 g/mol, or from 800 to 2,000 g/mol, or from 1,000 to 1,500 g/mol, or within a numerical range obtained by combining any two of the above indicated end points. The above introduction about the origin, preparation process, category, molecular structure and various parameters of first polyether polyol also apply to this second polyether polyol. According to an embodiment of the present disclosure, the amount of the above stated second polyether polyols can be 30-70 wt %, based on the total weight of the polyol component (B), such as within a numerical range obtained by combining any two of the following end points: 30 wt %, 32 wt %, 35 wt %, 38 wt %, 40 wt %, 42 wt %, 45 wt %, 48 wt %, 50 wt %, 52 wt %, 55 wt %, 58 wt %, 60 wt %, 62 wt %, 65 wt %, 68 wt % and 70 wt %, based on the total weight of the polyol component (B), or within a numerical range obtained by combining any two of the above indicated end points.

According to an embodiment of the present disclosure, the phosphorous-functionalized polyol is represented by Formula I Formula I

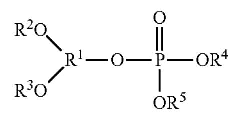

wherein $R^1$ is a trivalent $C_1$-$C_{16}$ alkylidene group or a trivalent poly(alkylene oxide) moiety having a Mn of 90 to 8,000, and each of $R^2$, $R^3$, $R^4$ and $R^5$ is independently selected from the group consisting of H, ($C_1$-$C_{12}$)alkyl and hydroxyl-($C_1$-$C_{12}$)alkylene group, with the proviso that at least two of the $R^2$, $R_3$, $R^4$ and $R^5$ are hydrogen. Each of $R^2$, $R^3$, $R^4$ and $R^5$ is independently selected from the group consisting of H and hydroxyl-($C_1$-$C_{12}$)alkylene group, such as hydroxyl-methylene group, hydroxyl-ethylene group, hydroxyl-propylene group, hydroxyl-butylene group, hydroxyl-pentylene group, hydroxyl-hexylene group, and the like. According to a preferable embodiment of the present disclosure, each of $R^2$, $R^3$, $R^4$ and $R^5$ is hydrogen.

In the context of the present disclosure, the term "trivalent $C_1$-$C_{16}$ alkylidene group" refers to an alkylidene group having from one to sixteen carbon atoms and having three hydrogen atoms replaced with covalent bonds which are respectively attached to the groups "—$OR^2$", "—$OR^3$" and "—O—P(═O)($OR^4$)($OR^5$)" as shown in Formula I. For example, the trivalent $C_1$ alkylidene group refers to a methenyl group having the molecular structure as follows:

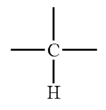

trivalent $C_1$ alkylidene group.

According to a specific embodiment of the present disclosure, $R^1$ can be a trivalent $C_1$-$C_{16}$ alkylidene group, or a trivalent $C_2$-$C_{15}$ alkylidene group, or a trivalent $C_3$-$C_{14}$ alkylidene group, or a trivalent $C_4$-$C_{12}$ alkylidene group, or a trivalent $C_5$-$C_{10}$ alkylidene group, or a trivalent $C_6$-$C_8$ alkylidene group.

In the context of the present disclosure, the term "trivalent poly(alkylene oxide) moiety" refers to a moiety represented by Formula IV:

Formula IV

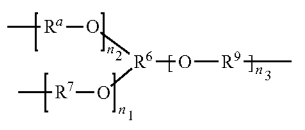

- wherein $R^6$ is a trivalent $C_1$-$C_{16}$ alkylidene group as stated above, such as a trivalent $C_1$-$C_{16}$ alkylidene group, or a trivalent $C_2$-$C_{15}$ alkylidene group, or a trivalent $C_3$-$C_{14}$ alkylidene group, or a trivalent $C_4$-$C_{12}$ alkylidene group, or a trivalent $C_5$-$C_{10}$ alkylidene group, or a trivalent $C_6$-$C_8$ alkylidene group;
- each of $R^7$, $R^8$ and $R^9$ independently represents $C_1$-$C_{16}$ alkylene group, such as $C_2$-$C_{14}$ alkylene group, or $C_2$-$C_{12}$ alkylene group, or $C_2$-$C_{10}$ alkylene group, or $C_2$-$C_8$ alkylene group, or $C_2$-$C_6$ alkylene group, or $C_3$-$C_4$ alkylene group; and
- each of $n_1$, $n_2$ and $n_3$ independently represents an integer of 1 to 10, such as 1, 2, 3, 4, 5, 6, 7, 8, 9, or 10.

According to an embodiment of the present disclosure, the trivalent poly(alkylene oxide) moiety has a Mn of 90 to 8,000, such as within a numerical range obtained by combining any two of the following end points: 90, 100, 200, 300, 400, 500, 600, 700, 800, 1000, 1200, 1500, 1800, 2000, 2200, 2500, 2800, 3000, 3200, 3500, 3800, 4000, 4200, 4500, 4800, 5000, 5200, 5500, 5800, 6000, 6200, 6500, 6800, 7000, 7200, 7500, 7800, and 8000. According to a preferable embodiment of the present disclosure, the above stated trivalent poly(alkylene oxide) moiety of Formula IV is derived from an alkoxylated glycerine.

According to an embodiment, the phosphorous-functionalized polyol of Formula I is included as an essential ingredient of polyol component (B).

According to an embodiment, the polyol component (B) comprises the phosphorous-functionalized polyol of Formula I and does not comprise the carboxylic acid functionalized-polyol represented by Formula II. According to another embodiment, the polyol component (B) comprises 1 wt % to 20 wt % of the phosphorous-functionalized polyol of Formula I, based on the total weight of the polyol component (B). For example, the amount of the phosphorous-functionalized polyol can be within a numerical range obtained by combining any two of the following end values: 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, based on the total weight of the polyol component (B).

According to an embodiment of the present disclosure, the carboxylic acid functionalized-polyol of Formula II is a compound having at least one acid side group and more than one hydroxyl terminal groups.

Formula II

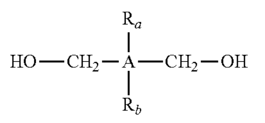

For example, in the Formula II, $R_a$ is a carboxylic acid group, or an ester/salt thereof; $R_b$ is selected from the group consisting of H, hydroxyl, carboxylic acid/ester/salt group, $C_1$-$C_6$ alkyl group, and $C_1$-$C_6$ alkoxy group; and A is selected from the group consisting of carbon, ($C_2$-$C_{100}$)-alkylene chain, polyalkylene oxide chain having a molecular weight of 500 to 3,000, and polyester chain having a molecular weight of 500 to 3,000. In the embodiments in which A is ($C_2$-$C_{100}$)-alkylene chain, polyalkylene oxide chain, or polyester chain, each of $R_a$ and $R_b$ may be independently attached to any carbon atom of the ($C_2$-$C_{100}$)-alkylene chain, polyalkylene oxide chain, or polyester chain, and additional carboxyl group, such as from one to nineteen additional carboxyl groups may be attached to any carbon atom of the ($C_2$-$C_{100}$)-alkylene chain, polyalkylene oxide chain, or polyester chain.

According to an embodiment of the present disclosure, the carboxylic acid functionalized-polyol of Formula II has a molecular weight from 500 to 5,000 g/mol, or from 600 to 4,000 g/mol, or from 700 to 3,000 g/mol, or from 800 to 2,000 g/mol, or from 1,000 to 1,500 g/mol, or within a numerical range obtained by combining any two of the above indicated end points. According to an embodiment of the present disclosure, the carboxylic acid functionalized-polyol of Formula II has a hydroxyl functionality of 1.8 to 2.5, such as at least 1.8, or at least 1.9, or at least 2.0, or at least 2.1, or at least 2.2, or up to 2.3, or up to 2.4, or up to 2.5, or within a numerical range obtained by combining any two of the above indicated end points. According to an embodiment of the present disclosure, the carboxylic acid functionalized-polyol of Formula II has a carboxyl functionality of 1 to 20, such as at least 2, or at least 3, or at least 4, or at least 5, or at least 6, or at least 7, or at least 8, or at least 9, or at least 10, or up to 11, or up to 12, or up to 13, or up to 14, or up to 15, or up to 16, or up to 17, or up to 18, or up to 19, or up to 20, or within a numerical range obtained by combining any two of the above indicated end points, wherein the carboxyl functionality refers to the average number of carboxyl group, including carboxylic acid group, carboxylate salt group and carboxylate ester group in one molecular represented by Formula II.

According to an embodiment of the present disclosure, the carboxylic acid functionalized-polyol of Formula II can be a monomeric compound such as 2-carboxy-propylene glycol, 2-carboxy-2-methyl-propylene glycol, 2-carboxy-butylene glycol, 2-carboxy-2-methyl-butylene glycol, 2-carboxy-pentadiol, 3-carboxy-pentadiol, and the like.

According to an embodiment of the present disclosure, the carboxylic acid functionalized-polyol of Formula II can be a polyalkylene-based compound. In such a polyol of Formula II, A is ($C_2$-$C_{100}$)-alkylene chain, while $R_a$ and $R_b$ can be attached to any carbon atoms of the ($C_2$-$C_{100}$)-alkylene chain.

According to an embodiment of the present disclosure, the carboxylic acid functionalized-polyol of Formula II can be a polyether-based compound. In such a polyol of Formula II, A is polyalkylene oxide chain having a molecular weight of 500 to 3,000, while $R_a$ and $R_b$ can be attached to any carbon atoms of the polyalkylene oxide chain.

According to an embodiment of the present disclosure, the carboxylic acid functionalized-polyol of Formula II can be a polyester-based compound. In such a polyol of Formula II, A is polyester chain having a molecular weight of 500 to 3,000, while $R_a$ and $R_b$ can be attached to any carbon atoms of the polyester chain.

The acid side group refers to a pendent group comprising at least one carboxylic group (which may exist in the state of free carboxylic acid group, carboxylate salt, carboxylate ester, or a combination thereof) laterally attached to the carbon of a monomeric compound, a polyalkylene chain, a polyalkylene oxide chain or a polyester backbone. For example, the pendent group comprising at least one carboxylic group may also be incorporated by e.g. modifying the hydroxyl group(s) attached to the carbon(s) of a monomeric compound, a polyalkylene chain, a polyalkylene oxide chain or a polyester backbone with anhydride. The anhydride used for the above stated modification is not specifically limited and examples thereof include trimellitic anhydride, phthalic anhydride, maleic anhydride and pyromellitic anhydride. The acid modification rate derived from the anhydride is based on the total weight of the polyol of Formula II. More specifically, the proportion of the anhydride can be 0.3 parts by weight or more and less than 10 parts by weight, preferably 0.4 parts by weight or more and less than 5 parts by weight, and more preferably 0.5 parts by weight or more and less than 5 parts by weight, based on 100 parts by weight of the polyol of Formula II. According to an embodiment of the present disclosure, the molar content of the carboxylic group can be from 0.1 mol % to 30 mol %, such as from 0.2 mol % to 25 mol %, or from 0.3 mol % to 20 mol %, or from 0.4 mol % to 15 mol %, or from 0.5 mol % to 10 mol %, based on the total molar amount of the carboxylic group and hydroxyl group contained in the polyol of Formula II. For example, the molar content of the carboxylic group can be within a numerical range obtained by combining any two of the following value points: 0.1 mol %, 0.2 mol %, 0.3 mol %, 0.4 mol %, 0.5 mol %, 0.6 mol %, 0.8 mol %, 1.0 mol %, 1.5 mol %, 2 mol %, 2.5 mol %, 3 mol %, 3.5 mol %, 4 mol %, 4.5 mol %, 5 mol %, 5.5 mol %, 6 mol %, 7 mol %, 8 mol %, 10 mol %, 12 mol %, 15 mol %, 17 mol %, 18 mol %, 19 mol %, 20 mol %, based on the total molar amount of the carboxylic group and hydroxyl group contained in the polyol of Formula II.

According to an embodiment, the carboxylic acid functionalized-polyol of Formula II is used in combination with phosphorous-functionalized polyol of Formula I. According to an embodiment, the polyol component (B) comprises 0 wt % to 30 wt % of the carboxylic acid functionalized-polyol, based on the total weight of the polyol component (B) For example, the amount of the carboxylic acid functionalized-polyol can be within a numerical range obtained by combining any two of the following end values: 0 wt %, 0.1 wt %, 0.2 wt %, 0.5 wt %, 0.8 wt %, 1 wt %, 1.2 wt %, 1.5 wt %, 1.8 wt %, 2 wt %, 2.5 wt %, 3 wt %, 3.5 wt %, 4 wt %, 4.5 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 22 wt %, 25 wt %, 28 wt %, 30 wt %, based on the total weight of the polyol component (B).

According to a preferable embodiment of the present disclosure, the polyol component (B) exclusively comprises a mixture of the carboxylic acid functionalized-polyol, the phosphorous-functionalized polyol, the second polyester polyol and the second polyether polyol, and does not comprise any other polyols. According to another preferable embodiment of the present disclosure, the polyol component (B) exclusively comprises a mixture of the phosphorous-functionalized polyol, the second polyester polyol and the second polyether polyol, and does not comprise any other polyols. According to a less preferable embodiment of the present disclosure, the polyol component (B) may further comprise one or more additional and traditional polyols such as polycarbonate polyol, polyacrylic polyol, ethylene-vinyl acetate polyol, silicone polyol, and the like.

The Application of the SL Adhesive Composition

According to various embodiments of the present disclosure, the two-component adhesive composition of the present disclosure may comprise one or more solvents or can be completely solventless. As disclosed herein, the terms "solvent free", "solventless" or "non-solvent", can be used interchangeably used and shall be interpreted that the mixture of all the raw materials used for preparing the adhesive composition comprise less than 3% by weight, preferably less than 2% by weight, preferably less than 1% by weight, more preferably less than 0.5% by weight, more preferably less than 0.2% by weight, more preferably less than 0.1% by weight, more preferably less than 100 ppm by weight, more preferably less than 50 ppm by weight, more preferably less than 10 ppm by weight, more preferably less than 1 ppm by weight of any organic or inorganic solvents, based on the total weight of the mixture of raw materials. As disclosed herein, the term "solvent" refers to organic and inorganic liquids whose function is solely dissolving one or more solid, liquid or gaseous materials without incurring any chemical reaction.

According to various embodiments of the present disclosure, the weight ratio between the isocyanate component (A) and the poloyl component (B) can be 100:(15-90). When the total weight of the isocyanate component (A) being taken as 100 parts by weight, the amount of poloyl component (B) can be from 15 to 90 parts by weight, such as within a numerical range obtained by combining any two of the following end values: 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 28 parts by weight, 30 parts by weight, 31 parts by weight, 32 parts by weight, 34 parts by weight, 35 parts by weight, 36 parts by weight, 38 parts by weight, 39 parts by weight, 40 parts by weight, 42 parts by weight, 44 parts by weight, 45 parts by weight, 46 parts by weight, 47 parts by weight, 48 parts by weight, 49 parts by weight, 50 parts by weight, 52 parts by weight, 53 parts by weight, 54 parts by weight, 55 parts by weight, 56 parts by weight, 57 parts by weight, 58 parts by weight, 59 parts by weight, 60 parts by weight, 62 parts by weight, 63 parts by weight, 64 parts by weight, 65 parts by weight, 66 parts by weight, 67 parts by weight, 68 parts by weight, 69 parts by weight, 70 parts by weight, 72 parts by weight, 73 parts by weight, 74 parts by weight, 75 parts by weight, 76 parts by weight, 77 parts by weight, 78 parts by weight, 79 parts by weight, 80 parts by weight, 82 parts by weight, 83 parts by weight, 84 parts by weight, 85 parts by weight, 86 parts by weight, 87 parts by weight, 88 parts by weight, 89 parts by weight and 90 parts by weight.

As stated above, the isocyanate component (A) and the polyol component (B) are transported and stored separately, combined shortly or immediately before being applied during the manufacture of the laminate article. In some embodiments, both the isocyanate component and the polyol component are liquid at ambient temperature. When it is desired to use the adhesive composition, the isocyanate component and the polyol component are brought into contact with each other and mixed together. Once mixed, polymerization (curing) reaction occurs between the free isocyanate groups in the isocyanate component (A) and the hydroxyl groups in the polyol component (B) to form a polyurethane which exhibit the function of adhesive in the adhesive layer between the at least one first substrate and the at least one second substrate. The adhesive composition formed by bringing the components (A) and (B) into contact can be referred to as a "curable mixture".

One or more catalysts may be optionally used to promote or accelerate the above stated polymerization reaction for preparing the prepolymer in the isocyanate component (A)

and/or the polymerization between the prepolymer of (A) and the polyol component (B).

The catalyst may include any substance that can promote the reaction between the isocyanate group and the hydroxyl group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

In general, the content of the catalyst used herein is larger than zero and is at most 1.0 wt %, preferably at most 0.5 wt %, more preferably at most 0.05 wt %, based on the total weight of all the reactants.

The SL adhesive composition of the present disclosure may optionally comprise any additional auxiliary agents and/or additives for specific purposes.

In one embodiment of the present disclosure, one or more of the auxiliary agents and/or additives may be selected from the group consisting of other co-catalysts, surfactants, toughening agents, flow modifiers, diluents, stabilizers, plasticizers, catalyst de-activators, dispersing agents and mixtures thereof.

A method of producing a laminate article using said adhesive composition is also disclosed. In some embodiments, the adhesive composition, such as the adhesive composition discussed above, is in a liquid state. In some embodiments, the composition is a liquid at 25° C. Even if the composition is solid at 25° C., it is acceptable to heat the composition as necessary to convert it into a liquid state. A layer of the composition is applied to a surface of a substrate or a film. A “substrate/film” is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. In some embodiments, the thickness of the layer of the curable mixture applied to the film is 1 to 5 μm.

A process for preparing the laminate material comprises the steps of (a) providing at least one first substrate and at least one second substrate; and (b) adhering the first substrate and the second substrate together by using the solventless adhesive composition of the present disclosure, wherein each of the first and second substrate is independently selected from the group consisting of metal foil, polymer layer, fabric layer, and combinations thereof.

The polymer which can be used for the first/second substrate can be selected from the group consisting of PE, HDPE, LDPE, PP, PVC, PET, PU, PV, PMA, PA, ABS, CA, EPDM, EVA, CPP, and any combinations or copolymers thereof.

The metal which can be used for the first/second substrate can be selected from the group consisting of Al, Al alloy, Fe, Steel, copper, copper alloy, Mg, Mg alloy, and any combinations or alloys thereof.

According to one embodiment of the present disclosure, each of the first substrate and the second substrate may have a thickness of from about 1 μm to 500 μm, such as within a numerical range obtained by using any two of the following values: 1 μm, 2 μm, 5 μm, 6 μm, 7 μm, 10 μm, 12 μm, 15 μm, 16 μm, 18 μm, 20 μm, 24 μm, 25 μm, 30 μm, 32 μm, 35 μm, 40 μm, 45 μm, 50 μm, 55 μm, 60 μm, 65 μm, 70 μm, 72 μm, 75 μm, 80 μm, 90 μm, 100 μm, 120 μm, 140 μm, 150 μm, 180 μm, 200 μm, 250 μm, 300 μm, 350 μm, 400 μm, 450 μm and 500 μm.

According to another embodiment of the present disclosure, the SL adhesive layer may have a thickness of from about 1 μm to 300 μm, such as within a numerical range obtained by using any two of the following values: 1 μm, 2 μm, 5 μm, 6 μm, 7 μm, 10 μm, 12 μm, 15 μm, 16 μm, 18 μm, 20 μm, 24 μm, 25 μm, 30 μm, 32 μm, 35 μm, 40 μm, 45 μm, 50 μm, 55 μm, 60 μm, 65 μm, 70 μm, 72 μm, 75 μm, 80 μm, 90 μm, 100 μm, 120 μm, 140 μm, 150 μm, 180 μm, 200 μm, 250 μm and 300 μm.

In some embodiments, a surface of another substrate/film is brought into contact with the layer of the curable mixture to form an uncured laminate. The adhesive composition may be applied by conventional lamination machine, e.g. Labo-Combi 400 machine from Nordmeccanica. The curable mixture is then cured or allowed to cure. The uncured laminate may be subjected to pressure, for example by passing through nip rollers, which may or may not be heated. The uncured laminate may be heated to speed the cure reaction. Suitable substrates/films include woven and nonwoven natural or synthetic fabric, metal foil, polymers, metal-coated polymers and polymers filled with various fillers and/or strengthening agents. Films optionally have a surface on which an image is printed with ink; and the ink may be in contact with the adhesive composition. In some embodiments, the substrates/films are polymer films or metal-coated polymer films, and more preferably are the combination of one metal foil and one polymer film. According to a preferable embodiment of the present disclosure, the laminate is a packaging material comprising a polymer layer, a metal film and an adhesive layer sandwiched therebetween, wherein the packaging material is preferably a packing material for food.

The process of the present disclosure may be carried out continuously or batchwise. An example of the continuous process is a roll to roll process, in which a roll of a substrate/film is unwound and transmitted through two or more work station where the isocyanate component (A) and the polyol component (B) are mixed to form the adhesive composition (curable mixture) of the present application which is applied onto a surface of the substrate/film. The adhesive composition (curable mixture) of the present application can be applied more than once to achieve a desirable film thickness or composition profile. A layer of foil may be applied onto the curable adhesive layer with or without the aid of rollers. Heating or irradiation devices may be arranged to promote the curing of the coated adhesive layer, and rollers can also be used for enhancing the adhesion strength within the laminate. The foil layer can also be unwound from a roll. The unwound substrates/film and foil can be from 10 to 20,000 meters, from 10 to 15,000 meters and preferably from 20 to 10,000 meters in length and are typically transmitted at a speed in the range from 0.1 to 60 m/min, preferably from 3 to 45 m/min, more preferable from 5 to 15 m/min. In the end of the continuous technology, the cured laminate product is wound up on a spindle.

The laminate (packaging) material disclosed herein can be cut or otherwise shaped so as to have a shape suitable for any desired purpose, such as packaging material.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

The information of the raw materials used in the examples is listed in the following table 1:

The Isocyanate Components (urethane prepolymers) are synthesized in a 1 L glass reactor. In particular, the diisocyanate monomers as shown in Table 2 were introduced into the reactor and maintained at 60° C. with nitrogen protection. Then the polyester glycol and additional polyols (such as polyether glycol and polycarbonate polyol, if any) shown in Table 2 were introduced into the reactor. The temperature of the reactor was slowly increased to 80-90° C. and maintained at this temperature until the theoretical NCO content is reached. The isocyanate component thus produced (i.e. the urethane prepolymer) was charged into a sealed container with nitrogen protection for further application.

TABLE 1

Raw materials used in the examples

| Brand name | Characterization | Vendor |
|---|---|---|
| Bester 648 | Polyester polyol having a OH functionality of 2 | Dow Chemical Company |
| Bester 115 | Polyester polyol having a OH functionality of 2 | Dow Chemical Company |
| Voranol CP450 | Polyether polyol having a OH functionality of 3 | Dow Chemical Company |
| XCPA-320 | Polyester polyol having a OH functionality of 2 | Xuchuan Chemical |
| UP-100 | Polycarbonate polyol having a OH functionality of 2 | UBG |
| MF C411 | Solventless polyol coreactant comprising a blend of Polyester polyol and Polyether polyol | Dow Chemical Company |
| Intermediate 88-102 | Polyester polyol coreactant | Dow Chemical Company |
| MF88-138 | Phosphorous-functionalized polyol of Formula I | Dow Chemical Company |
| HA-0135A | Carboxylic acid functionalized-polyol, having a OH functionality of 2 | GEO |
| Desmodur W (HMDI) | 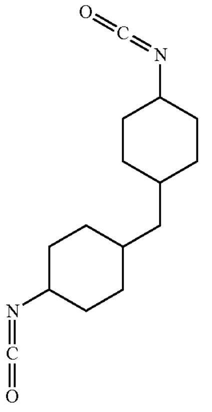 | Convestro co. ltd |
| IPDI | 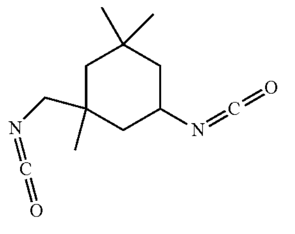 [SMILES: CC1(C)CC(N=C=O)CC(C)(CN=C=O)C1] | Convestro co. ltd |
| MF200C | Trimer of HDI | The Dow Chemical Company |

Preparation Examples of the Isocyanate Component A

Isocyanate Components (urethane prepolymer) of Inventive Preparation Examples (IPEx.) A1 to A4 and Comparative Preparation Example (CPEx.) A were synthesized according to the procedure described below using the relative contents of raw materials listed in Table 2, in percentage by weight based on total weight of the isocyanate component.

TABLE 2

Formulations of the component A

| | IPEx. A1 | IPEx. A2 | IPEx. A3 | IPEx. A4 | CPEx. A |
|---|---|---|---|---|---|
| HMDI | | 45 | 55 | 55 | |
| IPDI | 52 | | | | |
| MF200C | | | | | 100 |

TABLE 2-continued

| Formulations of the component A | | | | | |
|---|---|---|---|---|---|
| | IPEx. A1 | IPEx. A2 | IPEx. A3 | IPEx. A4 | CPEx. A |
| Bester 648 | 29.4 | 35 | 35 | 32 | |
| Bester 115 | | 20 | 10 | | |
| Voranol CP450 | 4.5 | | | 3 | |
| XCPA-320 | 4.5 | | | | |
| UP-100 | 9.6 | | | 10 | |
| Total | 100 | 100 | 100 | 100 | |

Preparation Examples of the Polyol Component B

Polyol Components of Inventive Preparation Examples (IPEx.) B1 to B4 and Comparative Preparation Example (CPEx.) B were synthesized by thoroughly blending the raw materials listed in Table 3 according to their specific amounts under ambient temperature, in percentage by weight based on total weight of the polyol component.

TABLE 3

| The Formulation of component B | | | | | |
|---|---|---|---|---|---|
| | IPEx. B1 | IPEx. B2 | IPEx. B3 | IPEx. B4 | CPEx. B |
| Bester 115 | 35 | | 45 | 35 | |
| Voranol CP450 | 55 | | 40 | 40 | |
| MF C411 | | 90 | | | |
| Intermediate 88-102 | | | | | 95 |
| MF88-138 | 10 | 10 | 5 | 10 | 5 |
| HA-0135A | | | 10 | 15 | |
| Total | 100 | 100 | 100 | 100 | 100 |

Examples 1-5 and Comparative Example 1

According to the following Table 4, the adhesive compositions of Examples 1 to 5 and Comparative Example 1 were synthesized by using the isocyanate components and polyol components prepared in the above indicated preparation examples. Laminates were prepared by using these adhesives in a Labo-Combi 400 machine from Nordmeccanica under the following processing conditions: line speed was set as 120 mpm and 150 mpm, temperature of transfer roller was 45° C., nip temperature was set as 60° C., and coating weight was set as 1.8 gsm. Different substrates were selected to form PET/Al and CPP/AI, wherein the PET substrate has a thickness of 12 μm, the CPP substrate has a thickness of 65 μm, and the Al foil has a thickness of 7 μm.

TABLE 4

| The formulations of Examples 1-5 and Comparative Example 1 | | |
|---|---|---|
| | Formulation | Molar ratio |
| Example 1 | IPEx. A1/IPEx. B1 | 100:35 |
| Example 2 | IPEx. A2/IPEx. B2 | 100:25 |

TABLE 4-continued

| The formulations of Examples 1-5 and Comparative Example 1 | | |
|---|---|---|
| | Formulation | Molar ratio |
| Example 3 | IPEx. A3/IPEx. B3 | 100:50 |
| Example 4 | IPEx. A4/IPEx. B4 | 100:50 |
| Example 5 | IPEx. A4/IPEx. B2 | 100:40 |
| Comparative Example 1 | CPEx. A/CPEx. B | 30:100 |

The bond strength (BS) and heat seal strength (HS) of these laminates were characterized by using the following technologies.

Test Technologies

Bond Strength (BS)

Laminates prepared with the adhesive compositions were cut into 15 mm width strips for T-peel test under 250 mm/min crosshead speed using a 5940 Series Single Column Table Top System available from Instron Corporation. During the test, the tail of each strip was pulled slightly by fingers to make sure the tail remained 90 degree to the peeling direction. Three strips for each sample were tested and the average value was calculated. Results were represented with the unit of N/15 mm. A higher value represents a better the bond strength.

Heat Seal Strength (HS)

Laminates prepared with the adhesive compositions were heat-sealed in a HSG-C Heat-Sealing Machine available from Brugger Company under 140° C. seal temperature and 300N pressure for 1 second, then cooled down and cut into 15 mm width strips for heat seal strength test under 250 mm/min crosshead speed using a 5940 Series Single Column Table Top System available from Instron Corporation. Three strips for each sample were tested and the average value was calculated. Results were represented with the unit of N/15 mm. A higher value represents a better heat seal strength.

Retorting Treatment

Laminates prepared with the adhesive compositions were cut into 8 cm×12 cm pieces which were heat sealed to form a bag with Moton soup, which was a blend of vinegar, tomato sauce and oil=1:1:1, enclosed therein. Then the bag was retorted for 30 minutes and then was inspected for any defects such as tunneling, de-lamination, or leakage, and the extents of said defects, if any, were recorded. A sample that passed the test should show no evidence of tunneling, de-lamination, or leakage. The bag was opened, emptied and cooled down, and then cut into 15 mm width strips to test the T-peel bonding strength and heat seal strength thereof in an Instron 5943 machine. Three strips for each sample were tested and the average value was calculated.

The Bond Strength, Heat Seal Strength and BiB properties were summarized in Table 5, from which it can be seen that all the inventive examples exhibit superior HS and BS which will not be deteriorated to an unacceptable extent even after the retorting treatment, while the comparative example exhibits much higher deterioration in the HS and BS after the retorting treatment.

TABLE 5

| Characterization Results (in N/15 mm) | | | | | | |
|---|---|---|---|---|---|---|
| | PET/Al BS | CPP/Al BS | CPP/Al HS | Retorting | CPP/Al BS after retorting | CPP/Al HS after retorting |
| Example 1 | 3.6 | 11 | 54 | Pass | 3.4 | 40 |
| Example 2 | 2.5 | 5.2 | 47 | Pass | 2.6 | 38 |
| Example 3 | 3.0 | 5.3 | 44 | Pass | 4.5 | 40 |
| Example 4 | 3.0 | 5.0 | 58 | Pass | 3.6 | 39 |
| Example 5 | 2.8 | 5.4 | 46 | Pass | 4.0 | 42 |
| Comparative Example 1 | 2.2 | 3.6 | 30 | Failed | 1.5 | 17 |

What is claimed is:

1. A solventless adhesive composition, comprising:

(A) an isocyanate component comprising a prepolymer which is the reaction product of reactants comprising: (a) at least one monomeric cycloaliphatic isocyanate compound comprising at least one cyclohexyl(ene) group and at least two isocyanate groups, and (b) at least one first polyol selected from the group consisting of a first polyester polyol, optionally a first polyether polyol, optionally a first polycarbonate polyol, and combinations thereof, wherein the prepolymer comprises more than one free isocyanate groups; and (B) a polyol component comprising at least one second polyol selected from the group consisting of a carboxylic acid functionalized-polyol having hydroxyl group and acid side group, a phosphorous-functionalized polyol comprising at least one phosphate ester group, a second polyester polyol, a second polyether polyol, and any combinations thereof, wherein the (B) polyol component comprises from 20 to 60 wt % of the second polyester polyol, from 30 to 70 wt % of the second polyether polyol, from 1 to 20 wt % of the phosphorous-functionalized polyol, and from 0 to 30 wt % of the carboxylic acid functionalized-polyol, based on the total weight of the (B) polyol component.

2. The solventless adhesive composition of claim 1, wherein the monomeric cycloaliphatic isocyanate compound is selected from the group consisting of isophorone diisocyanate (IPDI), methylene-bis(cyclohexylisocyanate) (HMDI), and a combination thereof.

3. The solventless adhesive composition of claim 1, wherein the phosphorous-functionalized polyol is represented by Formula I Formula I

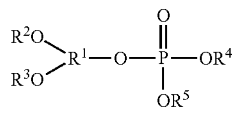

wherein $R^1$ is a trivalent $C_1$-$C_{16}$ alkylidene group or a trivalent poly(alkylene oxide) moiety having a Mn of 90 to 8,000, and each of $R^2$, $R^3$, $R^4$ and $R^5$ is independently selected from the group consisting of H, ($C_1$-$C_{12}$)alkyl and hydroxyl-($C_1$-$C_{12}$)alkylene group, with the proviso that at least two of the $R^2$, $R^3$, $R^4$ and $R^5$ are hydrogen; and the carboxylic acid functionalized-polyol is represented by Formula II Formula II

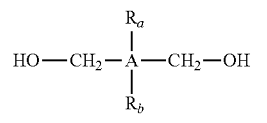

wherein $R_a$ is a carboxylic acid group, or an ester/salt thereof; $R_b$ is selected from the group consisting of H, hydroxyl, carboxylic acid/ester/salt group, $C_1$-$C_6$ alkyl group, and $C_1$-$C_6$ alkoxy group; and A is selected from the group consisting of carbon, ($C_2$-$C_{100}$)-alkylene chain, polyalkylene oxide chain having a molecular weight of 500 to 3,000, and polyester chain having a molecular weight of 500 to 3,000.

4. The solventless adhesive composition of claim 1, wherein the content of the (a) monomeric cycloaliphatic isocyanate compound is from 30 to 70 wt %, and the content of the (b) first polyol is from 30 to 70 wt %, based on the total weight of the isocyanate component (A); and the first polyol comprises from 50 wt % to 100 wt % of the first polyester polyol, based on the total weight of the first polyol.

5. The solventless adhesive composition of claim 1, wherein the weight ratio of the isocyanate component (A): the polyol component (B) is 100:(15-90).

6. The solventless adhesive composition of claim 1, wherein the first polyester polyol has an average functionality of 1.8 to 3 and a molecular weight from 500 to 5,000;

the first polyether polyol has an average functionality of 1.8 to 3 and a molecular weight from 400 to 5,000;

the first polycarbonate polyol has an average functionality of 1.8 to 3 and a molecular weight from 500 to 5,000;

the carboxylic acid functionalized-polyol has an average hydroxyl functionality of 1.8 to 2.5, an average carboxylic acid functionality of 1 to 20 and a molecular weight from 100 to 4,000;

the second polyester polyol has an average functionality of 1.8 to 3 and a molecular weight from 500 to 5,000; and the second polyether polyol has an average functionality of 1.8 to 3 and a molecular weight from 400 to 5,000.

7. The solventless adhesive composition of claim 1, wherein the (A) isocyanate component optionally further comprises (c) at least one secondary isocyanate compound other than the monomeric cycloaliphatic isocyanate compound, selected from the group consisting of $C_2$-$C_{16}$ aliphatic diisocyanate, $C_5$-$C_{18}$ cycloaliphatic diisocyanate, carbodiimide modified isocyanate, allophanate modified isocyanate, or a combination thereof; and/or the solventless adhesive composition is free of any polymerization unit derived from (meth)acrylate, (meth)acrylic acid, polylactone, polyolefin, bis-phenol resin, silane coupling agent and vinyl acetate.

8. A laminate material, comprising at least one first substrate, at least one second substrate, and at least one adhesive layer sandwiched therebetween, wherein the adhesive layer is derived from the solventless adhesive composition according to claim 1, and each of the first and second substrate is independently selected from the group consisting of metal foil, polymer layer, fabric layer, and combinations thereof.

9. A method of producing a laminate material comprising:

(a) providing at least one first substrate and at least one second substrate; and (b) adhering the first substrate and the second substrate together by using the solventless adhesive composition according to claim 1.

* * * * *